(12) United States Patent  
Becker et al.

(10) Patent No.: US 6,701,325 B2  
(45) Date of Patent: Mar. 2, 2004

(54) AUTOMATION SYSTEM WITH REUSABLE AUTOMATION OBJECTS AND METHOD FOR REUSING AUTOMATION SOLUTIONS IN ENGINEERING TOOLS

(75) Inventors: Norbert Becker, Erlangen (DE); Georg Biehler, Nürnberg (DE); Matthias Diezel, Laufamholz (DE); Albrecht Donner, Markersdorf (DE); Dieter Eckardt, Herzogenaurach (DE); Harald Herberth, Oberasbach (DE); Manfred Krämer, Wendelstein (DE); Dirk Langkafel, Effeltrich (DE); Ralf Leins, Ispringen (DE); Ronald Lange, Fürth (DE); Walter Möller-Nehring, Erlangen (DE); Jürgen Schmoll, Markt Berolzheim (DE); Karsten Schneider, Erlangen (DE); Ulrich Welz, Herzogenaurach (DE); Helmut Windl, Peisig (DE)

(73) Assignee: Siemens Aktiengesellschaft (DE)

( * ) Notice: Subject to any disclaimer, the term of this patent is extended or adjusted under 35 U.S.C. 154(b) by 151 days.

(21) Appl. No.: 09/950,153

(22) Filed: Sep. 10, 2001

(65) Prior Publication Data

US 2002/0073094 A1 Jun. 13, 2002

Related U.S. Application Data

(63) Continuation of application No. PCT/DE00/00739, filed on Mar. 9, 2000.

(51) Int. Cl.⁷ .............................................. G06F 17/30

(52) U.S. Cl. ...................................... 707/104.1; 700/83

(58) Field of Search ................................. 707/101, 102, 707/200, 104.1; 709/315, 318; 700/9, 69, 79, 83, 2, 5; 703/6; 364/188; 710/200, 2

(56) References Cited

U.S. PATENT DOCUMENTS

| 5,524,253 | A | * | 6/1996 | Pham et al. ................. 709/202 |
| 5,940,294 | A | * | 8/1999 | Dove .......................... 700/83 |
| RE36,602 | E | * | 3/2000 | Sebastian et al. ...... 364/468.03 |
| 6,201,996 | B1 | * | 3/2001 | Crater et al. .................... 700/9 |
| 6,230,309 | B1 | * | 5/2001 | Turner et al. ................ 717/107 |
| 6,233,538 | B1 | * | 5/2001 | Gupta et al. .................... 703/6 |
| 6,240,326 | B1 | * | 5/2001 | Gloudeman et al. .......... 700/83 |
| 6,327,594 | B1 | * | 12/2001 | Van Huben et al. ........ 707/200 |
| 6,449,659 | B1 | * | 9/2002 | Caron et al. ................. 709/315 |

FOREIGN PATENT DOCUMENTS

| DE | 19624929 | 1/1998 |
| WO | WO9711415 | 3/1997 |

OTHER PUBLICATIONS

Gerstner, T. et al.: "Rationelles Projektieren von Automatisierungssystem", Dec., 1994, pp. 42–45.

Mick, R. "Client/server computing comes to the plant floor.", Sep., 1993, pp. 41–42; 47–49.

Selch, M., et al.: "Step 7—The Future–Oriented Programming System for the New Simatic Programmable Controllers", Mar./Apr., 1994, pp. 5–6.

* cited by examiner

Primary Examiner—Charles Rones  
Assistant Examiner—Neveen Abel-Jalil  
(74) Attorney, Agent, or Firm—Baker Botts LLP

(57) ABSTRACT

The present invention relates to an automation system with at least one automation module (1), which has at least one automation object (A1–An), and with function modules (F1–F6), which contain means for central management and maintenance of the automation objects (A1–An). As a result, a manufacturer-independent definition of new automation objects, possibly using already existing automation objects, becomes possible, costly separate programming of new automation solutions is no longer necessary at all or is at least significantly simplified.

6 Claims, 4 Drawing Sheets

AUTOMATION SYSTEM WITH REUSABLE AUTOMATION OBJECTS AND METHOD FOR REUSING AUTOMATION SOLUTIONS IN ENGINEERING TOOLS

This is a [X] continuation of copending application Serial No. PCT/DE00/00739 filed Mar. 9, 2000, PCT Publication WO 00/54118, which claims the priority of DE 199 10 311.9, filed Mar. 9, 1999.

FIELD OF THE INVENTION

The present invention relates to an automation system with at least one automation module, which has at least one automation object.

BACKGROUND OF THE INVENTION

An automation system of the type mentioned above is used in particular in the area of automation engineering. An automation system of this type generally comprises a multiplicity of individual automation objects, in which the automation object is often highly dependent on the engineering system used. As a consequence, the automation objects of one manufacturer often require an engineering system of their own and cannot be used in other systems with automation objects of other manufacturers.

In the article by Gerstner, Thomas et al.: "Rationelles Projektieren von Automatisierungssystemen" [Efficient project planning of automation systems], Automatisierungstechnische Praxis—ATP, DE, Oldenbourg Verlag, Munich, Vol. 36, No. 12, pages 42–45, XP000483710, ISSN: 0178-2320, a description is given of a PC-supported engineering tool which reduces the project planning expenditure of automation systems in that extended copying functions and library functions are used and standard plans are supported.

SUMMARY OF THE INVENTION

The present invention is based on the object of specifying a way of reusing already created automation solutions in engineering. This object is achieved by a method and a system which is able to use the solutions produced in the course of development of an automation solution which are the same or a similar form from a previously created automation engineering solution, based on the same project or an entirely different one. In previous engineering systems, such as the Siemens engineering system Simatic S 7, there is a module concept. These modules offer a preset set of fixed automation functionalities. The complete automation solution is created by linking together the existing modules and their respective functionalities.

This module concept has the following disadvantages:
Manufacturer Definition of New Modules
Only the manufacturer of the engineering tool can define new modules. The developer of an automation solution has no possible way of integrating a solution or partial solution into a module.
Explicit Programming of New Modules
New modules must be explicitly programmed, which means additional expenditures, since not only their functionality has to be programmed but also their integration into the tool.
Modules are Very Generic
As a result of the way in which they are developed, the modules are not as tailor-made to the needs of one specific developer for automation solutions as they would be if the developer had derived the modules himself.

The method according to the present invention is based on two mutually independent concepts:
The aggregation of automation objects of a (part) solution to form a new automation object. This can then be used like any other automation object. Such an aggregated automation object is referred to hereafter as a "compound".
The automatic propagation of changes of automation objects in a library to automation objects in an automation solution. This means that adaptations in a model are automatically followed up in all used instances. This mechanism is referred to hereafter as a "central design specification".

BRIEF DESCRIPTION OF THE DRAWINGS

The present invention is described and explained in more detail below on the basis of the exemplary embodiments represented in the following figures, in which.

DETAILED DESCRIPTION OF THE INVENTION

Figure 1:
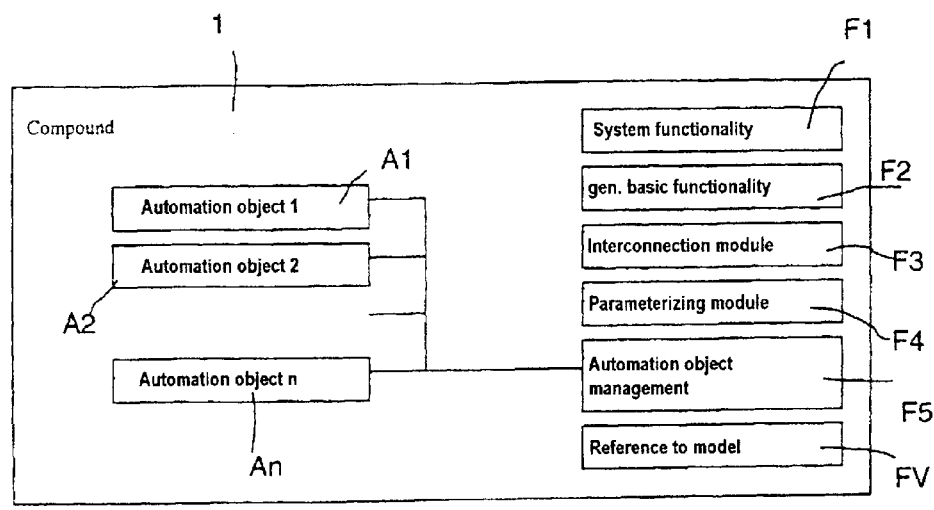
FIG. 1 shows a block diagram of an exemplary embodiment for the construction of an automation module.

FIG. 1 shows a block diagram of an exemplary embodiment for the construction of automation module 1, which is also referred to hereafter as a "compound." Compound 1 comprises function modules F1.–F5, i.e. the following five functional parts:

System functionality F1: internal services which essentially offer a basis for implementation for the other parts;

Generic basic functionality F2: general services which all automation objects have and which facilitate their handling, hidden within which are services such as storing and loading an automation object, inquiring management data etc. However, no technological services such as specific control algorithms are included;

Interconnection module F3: allows interconnection of the compound with other automation objects;

Parameterization module F4: allows parameterization of the compound by corresponding parameterization of its parts; and Automation object management F5: services such as insertion and access to the individual automation objects.

The automation objects may in this case themselves again be compounds. If one of the "part automation objects" was produced with a central design specification, changes in its model also become effective in the compound.

Figure 2:
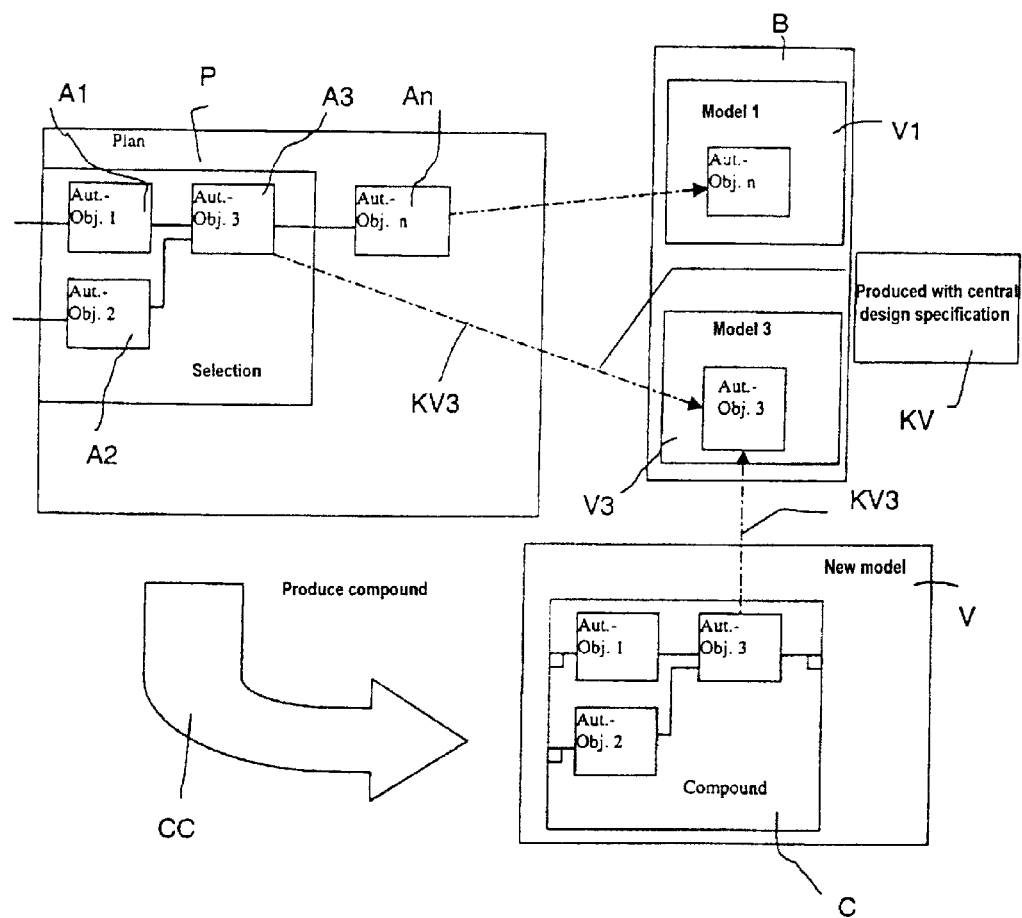
FIG. 2 shows a schematic representation for the process sequence for creating an automation module as a model.

FIG. 2 shows a schematic representation for the process sequence for creating an automation module as a model. The starting point is an automation plan P, which includes an interconnection of automation objects A1–An. The automation objects A1–An are based on models V1, V3 of a library B. Specially designated in the automation plan P is a selection region S, which selects an interconnection of automation objects A1, A2, A3. The automation objects A1–An are linked with their models of the library B. In this case, the automation object A3 was produced with a central design specification, intended to be graphically indicated by the designations KV, KV3. To create a new automation module, the function CC, graphically indicated as an arrow, is used to produce a new automation module in the form of the compound C as a new model by selection of the region S in the automation plan P.

In the starting situation there is a certain (part) solution, which comprises interconnected automation objects, which may also themselves be compounds. To produce a compound as a model, the set which represents the part solution is selected. This may happen graphically, for example. Thereafter, the creation of the compound is initiated. For this purpose, a new model is produced, into which an empty compound is entered. After that, all the selected automation objects are copied and entered in the compound. All interconnections within the selected set are retained, the other interconnections are cut off. If a selected automation object was produced with a central design specification, this also applies for its copy in the compound.

When the automation objects are inserted into the compound, two modules are automatically produced for the interconnecting and parameterizing of the compound. The parameterizing module is generated from the the parameterizing modules of the automation objects, the interconnection module is derived from the cut-off interconnections. Both modules can be worked on subsequently by the user.

The use of a compound may take place in two ways: an instance of a compound is produced in a plan from a model with a central design specification or with a duplicated design specification. In both cases, the compound can be used like a normal automation object. This is explained in more detail below with reference to FIGS. 3 and 4.

Figure 3:
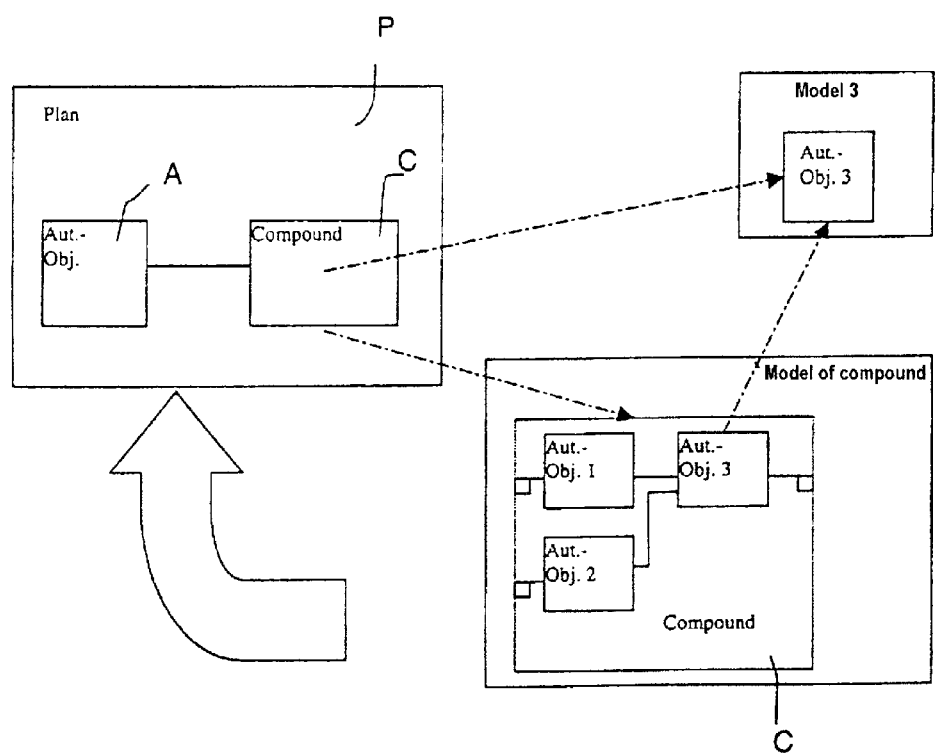
FIG. 3 shows an exemplary embodiment of a process sequence for creating an automation module with a central design specification.

FIG. 3 shows an exemplary embodiment of a process sequence for creating an automation module with a central design specification. In this case, the model of the automation module C is inserted into an automation plan P, accompanied by the central design specification. Producing an instance with a central design specification means that changes in the model are automatically propagated to the instances. For this purpose, instances can be registered when they are used in the model, so that the follow-up from the model can be carried out by corresponding data exchange. If components of the compound have been produced with a central design specification, this also applies for the parts in the instance.

Figure 4:
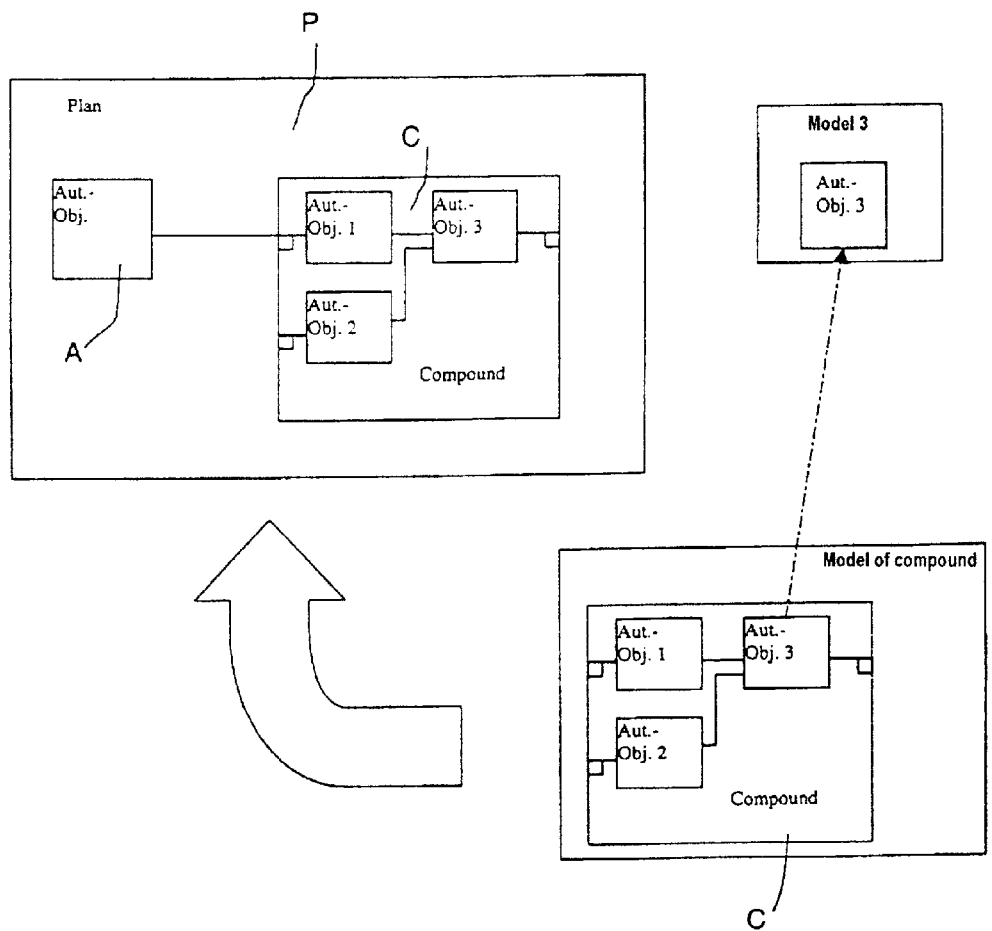
FIG. 4 shows an exemplary embodiment of a process sequence for creating an automation module with a duplicated design specification.

FIG. 4 shows an exemplary embodiment of a process sequence for creating an automation module with a duplicated design specification. Producing an instance with a duplicated design specification means that the model is completely copied and, as a result, the instance becomes independent of the model. Changes in the model are consequently not propagated to the instance. If components of the compound have been produced with a central design specification, this relationship is terminated.

The main difference from the previous solution is the capability of aggregating a set of automation objects on an ad-hoc basis to form a new set. The solution described has the following advantages:

Simple creation of reusable solutions—The developer of the automation solution can create a reusable model by means of visual programming (i.e. drag and drop, etc.);

Modules are tailor-made—Each developer can create a collection of models for his application domain;

Automatic replication of changes—The "central design specification" technique allows changes in a model to be propagated to all automation solutions concerned. This reduces the maintenance expenditure considerably; and Reduction in development time—The presence of extensive libraries with tailor-made part solutions means that applications do not constantly have to be developed from scratch.

In summary, the present invention relates to an an automation system with at least one automation module 1, which has at least one automation object A1–An, and with function modules F1–F6, which contain means for central management and maintenance of the automation objects A1–An. As a result, manufacturer-independent of new automation objects, and possibly using already existing automation objects, becomes possible and costly separate programming of new automation solutions is no longer necessary at all or is at least significantly simplified.

What is claimed is:

1. A method for the aggregation of automation objects using models from a library to form a new automation module wherein interconnection of the automation objects are selected from a selection region in an automation plan which contains an interconnection of the automation objects and the selection of the said region producing the new automation module as a model, further wherein all the interconnections within the selection region are retained and the other interconnections are cut-off, and an interconnection module for the interconnection of the new automation module having further automation objects comprising a first parameterization module for the parameterization of the new automation module automatically produced in the new automation module, said first parameterization module being generated from second parameterization modules of the selected automation objects and the interconnection module being derived from the cut-off interconnections.

2. The method according to claim 1, wherein changes to the models for the automation objects in the library automatically lead via data exchange to corresponding changes to the automation objects in previously used instances in an automation solution.

3. The method according to claim 2, wherein the automation objects are produced in the used instances from the models for the automation objects and are registered in the models, the models containing central design specifications.

4. A system for the aggregation of automation objects based on models of a library to form a new automation module comprising an automation plan including an interconnection of the automation objects, a selection of an interconnection of the automation objects for producing the new automation module as a model being provided in the automation plan, wherein all the interconnection selections are retained and all other interconnections are cut-off, and wherein an interconnection module is derived from the cut-off interconnections, for the interconnection of the new automation module with further automation objects comprising a first parameterization module generated from second parameterization modules of the selected automation objects for parameterization of the new automation module which are provided in the new automation module.

5. The system according to claim 4, wherein a data exchange is provided for the automatic passing on of changes to the models for the automation objects in the library to the automation objects in used instances in an automation solution.

6. The system according to claim 5, wherein central design specifications in the models for producing the automation objects in the used instances are provided, and which a registration of the automation objects in the models is provided.

* * * * *